United States Patent
Wanami et al.

(10) Patent No.: US 7,454,976 B2
(45) Date of Patent: Nov. 25, 2008

(54) PRESSURE SENSOR FOR A VEHICLE

(75) Inventors: Shingo Wanami, Kariya (JP); Toshihito Nonaka, Chiryu (JP); Satoru Takehara, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/512,767

(22) Filed: Aug. 30, 2006

(65) Prior Publication Data
US 2007/0089520 A1   Apr. 26, 2007

(30) Foreign Application Priority Data
Aug. 31, 2005   (JP)   ............................. 2005-252412

(51) Int. Cl.
*G01L 7/10* (2006.01)
(52) U.S. Cl. .............................. 73/730; 73/700; 73/714; 73/715; 361/283.1
(58) Field of Classification Search ........... 73/700–756; 361/283.1–283.4
See application file for complete search history.

(56) References Cited

U.S. PATENT DOCUMENTS

| | | | |
|---|---|---|---|
| 5,648,615 A | | 7/1997 | Jeske et al. |
| 5,661,244 A | | 8/1997 | Nishimura et al. |
| 5,858,224 A | * | 1/1999 | Schwandt et al. ............. 210/90 |
| 6,453,749 B1 | * | 9/2002 | Petrovic et al. ............... 73/754 |
| 6,553,841 B1 | * | 4/2003 | Blouch ........................ 73/755 |
| 6,615,669 B1 | * | 9/2003 | Nishimura et al. ............ 73/756 |
| 6,647,793 B2 | | 11/2003 | Dirmeyer et al. |
| 6,675,654 B2 | * | 1/2004 | Hegner et al. ................. 73/715 |
| 6,807,864 B2 | * | 10/2004 | Takakuwa et al. ............ 73/706 |
| 7,055,391 B2 | * | 6/2006 | Tokuhara ..................... 73/700 |
| 7,104,136 B2 | | 9/2006 | Akiyama et al. |
| 7,331,238 B2 | * | 2/2008 | Wanami et al. ............... 73/714 |
| 7,406,875 B2 | * | 8/2008 | Wanami et al. ............... 73/715 |

FOREIGN PATENT DOCUMENTS

| | | |
|---|---|---|
| DE | 103 33 964 | 2/2005 |
| JP | 02-249740 | 10/1990 |
| JP | 2-140340 | 11/1990 |
| JP | 09195813 | 7/1997 |

OTHER PUBLICATIONS

Office Action dated Nov. 2, 2007 in German Application No. 10/2006 040665.6 with English translation thereof.

* cited by examiner

*Primary Examiner*—Andre J Allen
*Assistant Examiner*—Jermaine Jenkins
(74) *Attorney, Agent, or Firm*—Harness, Dickey & Pierce, PLC

(57) ABSTRACT

A pressure sensor includes a case with an air passageway having a first opening leading to an inside of the case and a second opening leading to an outside of the case, pressure sensing means that is placed inside the case and includes a pressure sensing surface for detecting pressure, and a breathable filter that is provided with the air passageway to cover at least one of the first and second openings. The pressure sensing means is fixed to the case through mounting means that allows the pressure sensing means to be spaced from the case to prevent stress that is applied to the pressure sensing means by the case.

9 Claims, 3 Drawing Sheets

PRESSURE SENSOR FOR A VEHICLE

CROSS REFERENCE TO RELATED APPLICATION

This application is based on and incorporates herein by reference Japanese Patent Application No. 2005-252412 filed on Aug. 31, 2005.

FIELD OF THE INVENTION

The present invention relates to a pressure sensor.

BACKGROUND OF THE INVENTION

Typically, a vehicle is equipped with an occupant protection system for protecting an occupant from injury in a collision. As examples of the occupant protection system, an airbag system inflates an airbag to protect a head of the occupant and a pretensioner system takes up slack in a seatbelt to firmly hold the occupant in the collision. Such an occupant protection system is controlled by an electrical control unit (ECU). The ECU determines whether the collision occurs based on a sensor signal from a sensor mounted on the vehicle. When the ECU determines that the collision occurs, the ECU activates the occupant protection system.

Recently, there has been an increase in demand for not only front/rear impact safety but also side impact safety. A side airbag system, disclosed in, for example, JP-H2-249740A, protects the occupant from a side impact in a side collision. A pressure sensor used in the side airbag system measures a change in pressure inside a door of the vehicle to detect the side impact.

FIG. 3 shows a conventional pressure sensor 1 for detecting the side impact. The conventional pressure sensor 1 has a hollow case 2 with an air passageway 22 through which air is introduced into the case 2. A circuit assembly 3 housed in the hollow case 2 includes a circuit board 30 and a pressure sensing element 31 mounted on the circuit board 30. The conventional pressure sensor 1 needs to be waterproofed. Therefore, a rubber gasket (packing) member 6 is placed between the case 2 and the pressure sensing element 31 to prevent water from entering the conventional pressure sensor 1 except for a surface of the pressure sensing element 31. Thus, the circuit board 30 is protected from water damage so that the circuit board 30 can work properly.

Each of the case 2, the circuit board 30, and the pressure sensing element 31 requires a high dimensional accuracy to seal the inside the conventional pressure sensor 1 with the rubber gasket member 6. This requirement increases manufacturing cost of the conventional pressure sensor 1.

The rubber gasket member 6 is pressed between the case 2 and the pressure sensing element 31 mounted on the circuit board 30 and stress is applied to an electrical junction between the circuit board 30 and the pressure sensing element 31 by the case 2. Therefore, it is difficult to ensure reliability of the electrical junction, circuit elements mounted on the circuit board 30, and the pressure sensing element 31.

The conventional pressure sensor 1 further includes a potting member 25 for supporting the circuit assembly 3. Whereas the potting member 25 improves waterproofness of the conventional pressure sensor 1 and reduces stress concentration on the circuit board 30 and the pressure sensing element 31, the potting member 25 increases the manufacturing cost of the conventional pressure sensor 1.

SUMMARY OF THE INVENTION

In view of the above-described problem, it is an object of the present invention to provide a low-cost pressure sensor having high reliability.

A pressure sensor includes a case with an air passageway having a first opening leading to an inside of the case and a second opening leading to an outside of the case, pressure sensing means that is placed inside the case and includes a pressure sensing surface for detecting pressure, and a breathable filter that is provided with the air passageway to cover at least one of the first and second openings. The filter prevents foreign matter such as water or dust from entering the case. Further, the filter ensures proper airflow between the outside and inside of the case so that the pressure sensing means placed inside the case can measure pressure outside the case.

Assembling of the pressure sensor doesn't require high positioning accuracy, because the pressure sensor has no rubber gasket member placed between the pressure sensing means and the case. Therefore, the pressure sensor can be manufactured at low cost. The pressure sensing means is fixed to the case through mounting means that allows the pressure sensing means to be spaced from the case. Therefore, there is no stress applied to the pressure sensing means by the case.

Thus, the pressure sensor can be manufactured at low cost and have high reliability.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
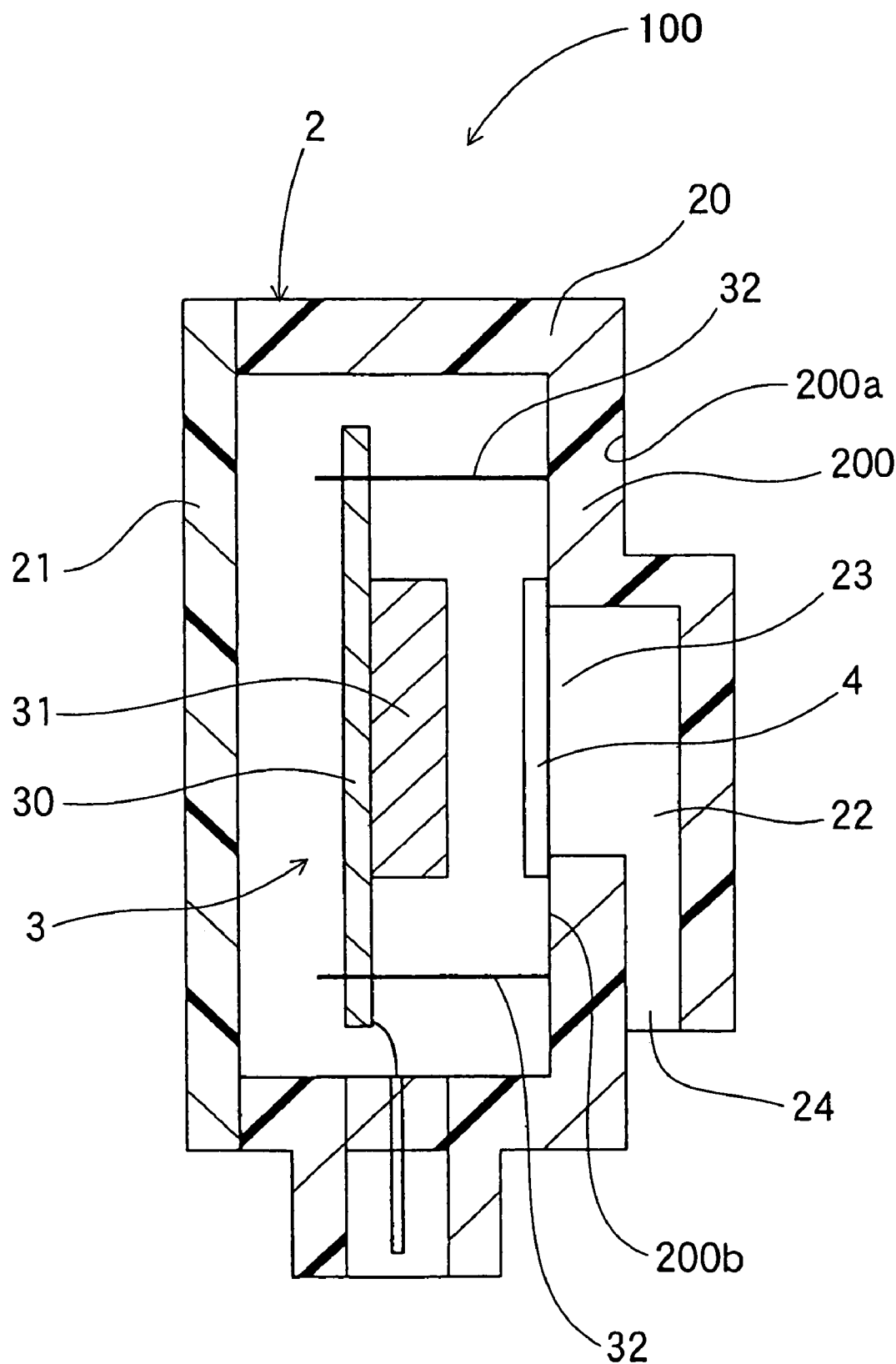
FIG. 1 is a cross-sectional view of a pressure sensor according to a first embodiment of the present invention.

Referring to FIG. 1, a pressure sensor 100 includes a hollow case 2 made from resin, a circuit assembly 3, and a breathable filter 4.

The case 2 has a tub-shaped body 20 and a lid 21. The body 20 includes a top (left side of FIG. 1) opening covered by the lid 21, an air passageway 22, and a bottom (right side of FIG. 1) portion 200 provided with the air passageway 22. The pressure sensor 100 is mounted on the vehicle such that the bottom portion 200 extends vertically. The air passageway 22 has a first opening 23 leading to the inside of the body 20 and a second opening 24 leading to the outside of the body 20. Air flows through the air passageway 22 so that pressure inside the case 2 becomes equal to pressure outside the case 2.

The air passageway 22 is shaped like a pipe with a substantially constant cross section and an inner diameter that ensures proper airflow. The air passageway 22 extends along an outer surface 200a of the bottom portion 200 in a downward vertical direction such that the second opening 24 faces the downward vertical direction. The air passageway 22 is long or curves so that the first opening 23 is invisible from the second opening 24.

The circuit assembly 3 includes a circuit board 30 and a pressure sensing element 31 mounted on the circuit board 30.

The circuit board 30 has processing means (not shown) that calculates pressure from a detection signal input from the pressure sensing element 31 and an interface (not shown) through which a pressure signal indicating the calculated pressure is transmitted to an external device. The circuit assembly 3 may be, for example, a diaphragm type pressure sensor.

A mounting member 32 fixes the circuit assembly 3 to the body 20 in such a manner that the pressure sensing element 31 faces the first opening 23 of the air passageway 22 and is slightly spaced from the bottom portion 200.

The filter 4 prevents foreign matter such as water or dust, which past through the air passageway 22, from entering the case 2 and ensures proper airflow between the outside and inside of the case 2. The filter 4 is fixed to an inner surface 200b of the bottom portion 200 to cover the first opening 23 of the air passageway 22. For example, an outer edge of the filter 4 is welded to the inner surface 200b. Alternatively, the filter 4 is bonded to the inner surface 200b through an adhesive member such as an adhesive tape. Alternatively, the case 2 may have a hook to which the filter 4 is attached.

The pressure sensor 100 is manufactured as follows: First, the filter 4 is welded to the body 20 to cover the first opening 23 of the air passageway 22. Second, the circuit assembly 3 is fixed to the body 20 through the mounting member 32. Finally, the lid 21 is welded to the body 20 to cover the top opening of the body 20 and the pressure sensor 100 is achieved.

Since the lid 21 is finally attached to the body 20, the pressure sensor 100 can be assembled from the top opening side of the body 20. Thus, the pressure sensor 100 can be easily manufactured. Since the circuit assembly 3 is fixed to the body 20 through the mounting member 32, assembly of the pressure sensor 100 does not require high positioning accuracy. Thus, the pressure sensor 100 can be manufactured at low cost, as compared to the conventional pressure sensor 1, in which the circuit assembly 3 is fixed to the case 2 through the rubber gasket member 6.

Since the circuit assembly 3 is fixed to the body 20 through the mounting member 32, there is no stress applied to the circuit assembly 3 by the case 2. Further, stress concentration on the circuit board 30 can be prevented, because the circuit assembly 3 is fixed to the body 20 such that the circuit assembly 3 is spaced from the lid 21. Thus, the pressure sensor 100 can work properly without problems due to stress concentration.

Therefore, the pressure sensor 100 can be manufactured at low cost and have high reliability.

Figure 2A:
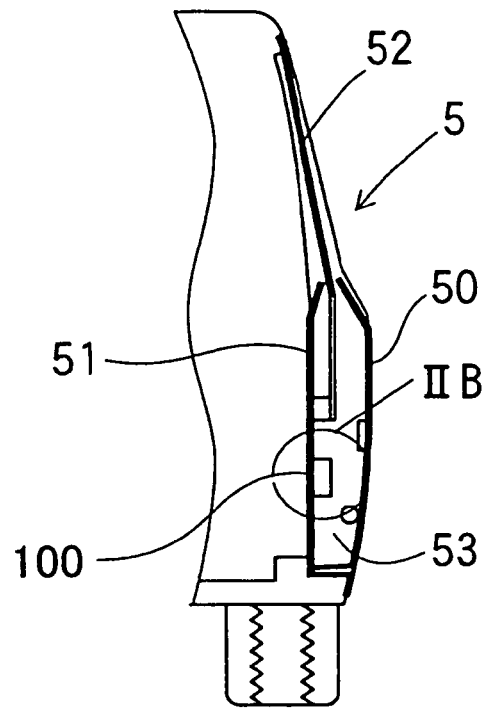
FIG. 2A is a schematic view of a collision detection system employing the pressure sensor of FIG. 1.
Figure 2B:
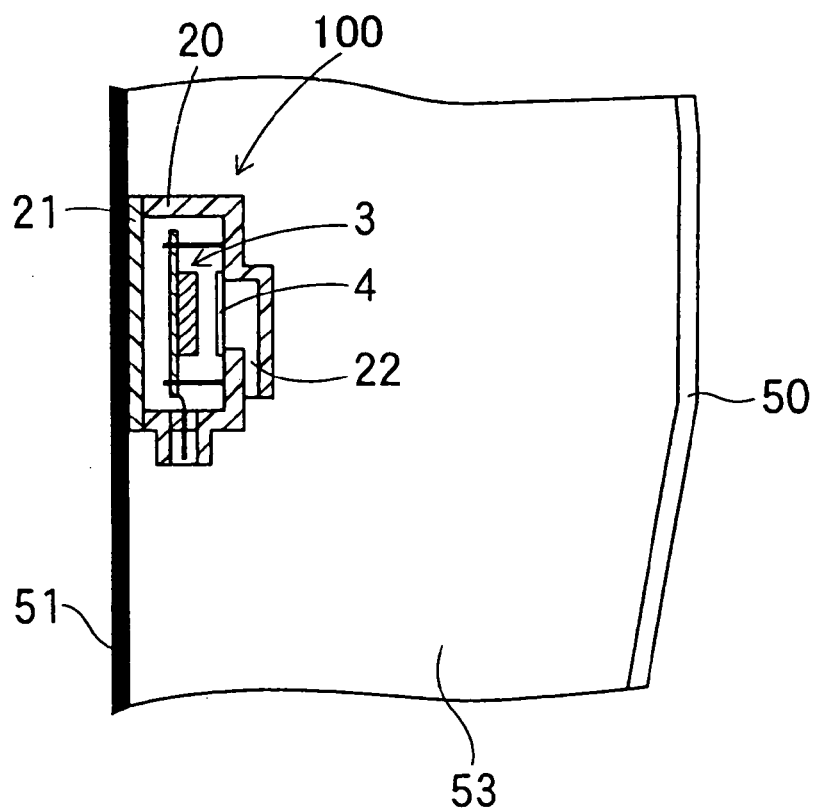
FIG. 2B is an enlarged view of a portion IIB of FIG. 2A; and, FIG. 3 is a cross-sectional view of a conventional pressure sensor.
Figure 3:
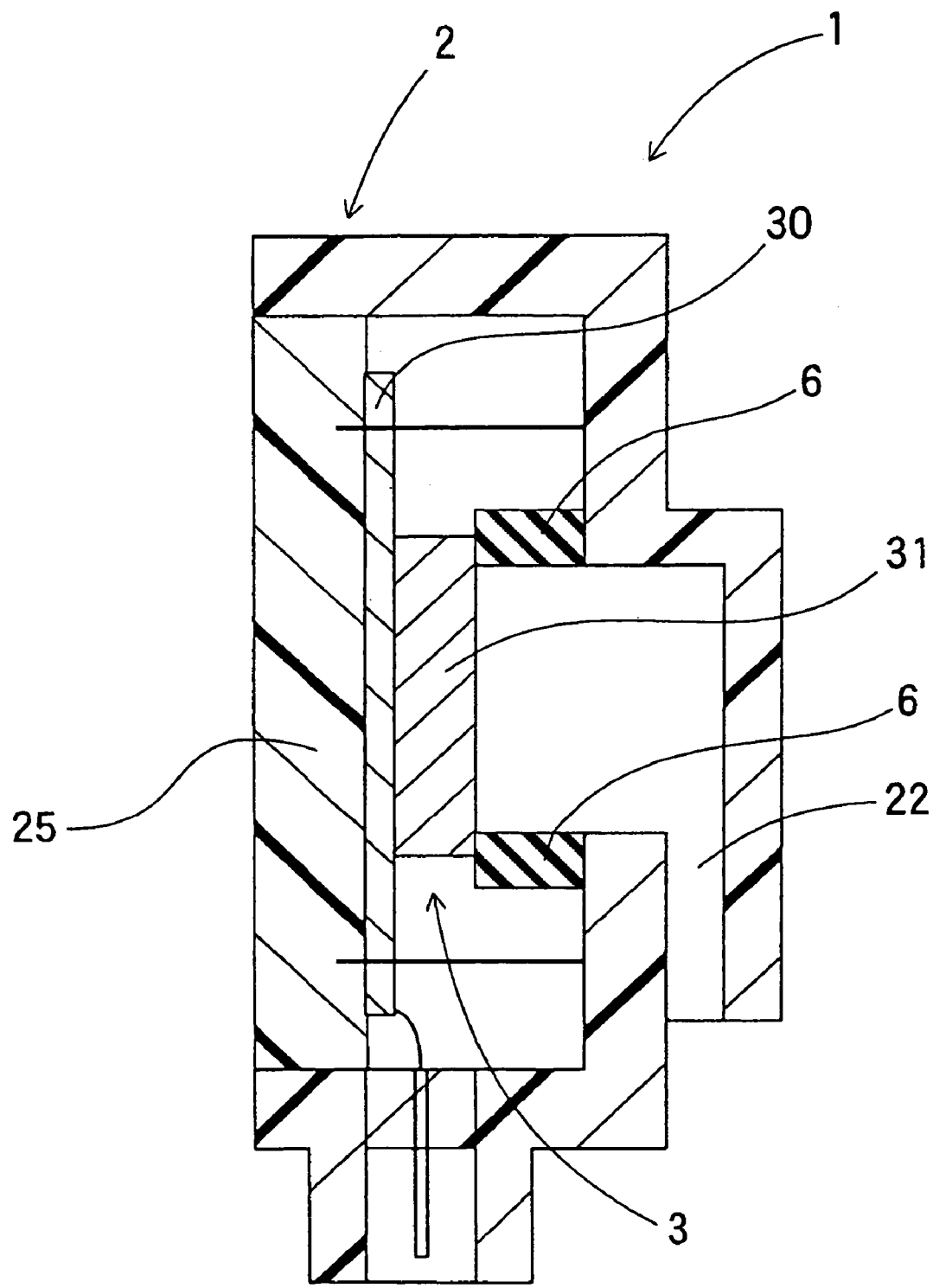

FIGS. 2A and 2B show a collision detection system that employs the pressure sensor 100. The collision detection system is a part of an occupant protection system that inflates a side airbag to protect an occupant of a vehicle in a side impact collision.

The pressure sensor 100 is installed inside a door 5 of the vehicle in such a manner that the air passageway 22 extends in the downward vertical direction. When the side impact collision occurs, the door 5 deforms and pressure inside the door 5 changes due to the deformation of the door 5. The collision detection system detects the side impact collision by measuring the change in the pressure inside the door 5 with the pressure sensor 100. When the side impact collision is detected, the side airbag is inflated.

The door 5 includes an outer panel 50 that is part of an outer surface of the vehicle, an inner panel 51, and a windowpane 52. A space 53 is provided between the outer panel 50 and the inner panel 51. The space 53 is approximately sealed such that the inside of the door 5 slightly communicates with the outside of the door 5. Thus, pressure in the space 53 changes with pressure outside the door 5 and increases when a sudden change in volume of the space 53 occurs.

When an object collides with the door 5, the object presses the outer panel 50 toward the interior of the vehicle. Due to the pressing force, the outer panel 50 deforms and is recessed toward the inner panel 51. The inner panel 51 maintains its shape for a certain period of time after the collision, because the pressing force is not applied directly to the inner panel 51. Therefore, when the outer panel 50 deforms, the volume of the space 53 suddenly decreases. Since the space 53 is approximately sealed, the pressure in the space 53 suddenly increases due to the sudden decrease in volume of the space 53. The pressure sensor 100 measures the pressure in the space 53.

When the pressure in the space 53 increases, pressure around the pressure sensor 100 increases accordingly. Then, pressure inside the case 2 of the pressure sensor 100 increases, because the pressure around the pressure sensor 100 is transmitted through the air passageway 22 into the case 2. The transmitted pressure is applied to the pressure sensing element 31 of the circuit assembly 3. Thus, the pressure sensor 100 measures the pressure in the space 53. The circuit assembly 3 generates a pressure signal based on the measured pressure and outputs the pressure signal to an airbag ECU (not shown). The airbag ECU determines from the pressure signal whether the side impact collision occurs. When the airbag ECU determines that the side impact collision occurs, the airbag ECU inflates the side airbag.

In the collision detection system, the pressure sensor 100 is installed inside the door 5 in such a manner that the air passageway 22 extends in the downward vertical direction and the second opening 24 of the air passageway 22 faces the downward vertical direction. Thus, when the foreign matter such as water or dust enters the space 53 inside the door 5, the foreign matter is prevented from entering the air passageway 22. Even if the foreign matter enters the air passageway 22, gravity of the foreign matter prevents the foreign matter from passing through the air passageway 22. Even if the foreign matter passes through the air passageway 22, the filter 4 prevents the foreign matter from entering the case 2. In this case, the foreign matter settling on the filter 4 slides along a surface of the filter 4 and falls off the filter 4. Therefore, the filter 4 is prevented from clogging with the foreign matter.

The embodiment described above may be modified in various ways. For example, the filter 4 may be provided with each of the first and second openings 23, 24 of the air passageway 22. Various types of pressure sensors can be used as the circuit assembly 3. The filter 4 can be made from various types of materials that allow the filter 4 to breathe.

Such changes and modifications are to be understood as being within the scope of the present invention as defined by the appended claims.

What is claimed is:

1. A pressure sensor for a vehicle comprising:
   a case that includes an air passageway having a first opening leading to an inside of the case and a second opening leading to an outside of the case;
   pressure sensing means that is placed inside the case and includes a pressure sensing surface for detecting pressure;
   a breathable filter that is placed inside the case provided with the air passageway to cover at least one of the first and second openings; and mounting means that fixes the pressure sensing means to the case such that the pressure sensing means is spaced from the case and the pressure sensing surface faces the breathable filter.

2. The pressure sensor according to claim 1, wherein at least one of the first and second openings faces a horizontal direction, and
the breathable filter covers the at least one of the first and second openings facing the horizontal direction.

3. The pressure sensor according to claim 1, wherein the breathable filter covers one of the first and second openings of the air passageway.

4. The pressure sensor according to claim 3, wherein the breathable filter covers the first opening of the air passageway.

5. The pressure sensor according to claim 4, wherein the air passageway curves such that the filter is invisible from the second opening.

6. The pressure sensor according to claim 4, wherein the air passageway curves to prevent an object entering the air passageway through the second opening from directly reaching the filter.

7. The pressure sensor according to claim 1, wherein the air passageway extends in a downward vertical direction, and
the second opening faces the downward vertical direction.

8. The pressure sensor according to claim 1, wherein the pressure sensor measures pressure inside a door of the vehicle to detect a side impact collision of the vehicle.

9. The pressure sensor according to claim 1, wherein the breathable filter is located a first distance from the first opening and a second distance from the second opening, the second distance being greater than the first distance.

* * * * *